Sept. 2, 1952  W. H. RUPP  2,608,838
DRY ICE MANUFACTURE
Filed June 30, 1949  2 SHEETS—SHEET 1

Walter H. Rupp  Inventor
By W. O. T. Heilman  Attorney

UNITED STATES PATENT OFFICE 2,608,838

DRY ICE MANUFACTURE

Walter H. Rupp, Mountainside, N. J., assignor to Standard Oil Development Company, a corporation of Delaware Application June 30, 1949, Serial No. 102,269

4 Claims. (Cl. 62—170)

The present invention is concerned with a process for the manufacture of carbon dioxide Dry Ice. The invention is more particularly concerned with a fluidized process for the manufacture of Dry Ice spheres of predetermined sizes. In accordance with the present process, Dry Ice or solid carbon dioxide is manufactured by introducing liquid or gaseous carbon dioxide into a zone wherein cooling is accomplished by means of a circulating stream of gas.

It is known in the art to manufacture Dry Ice or solidified carbon dioxide by various procedures. However, it has now been discovered that improved results can be obtained provided the cooling in the solidification zone is accomplished by means of a circulating gas phase. The present invention may be readily understood by reference to the drawings illustrating embodiments of the same.

Figure 1:
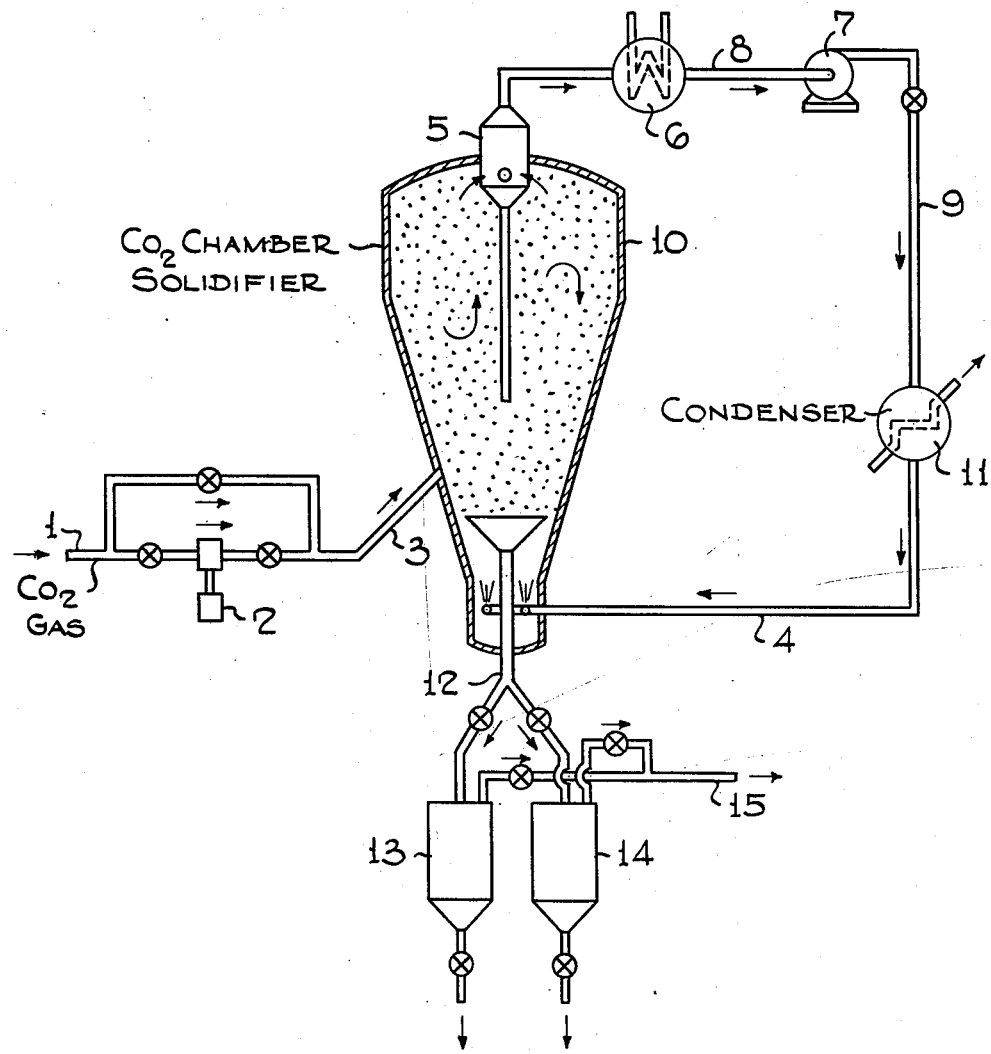
Figure 2:
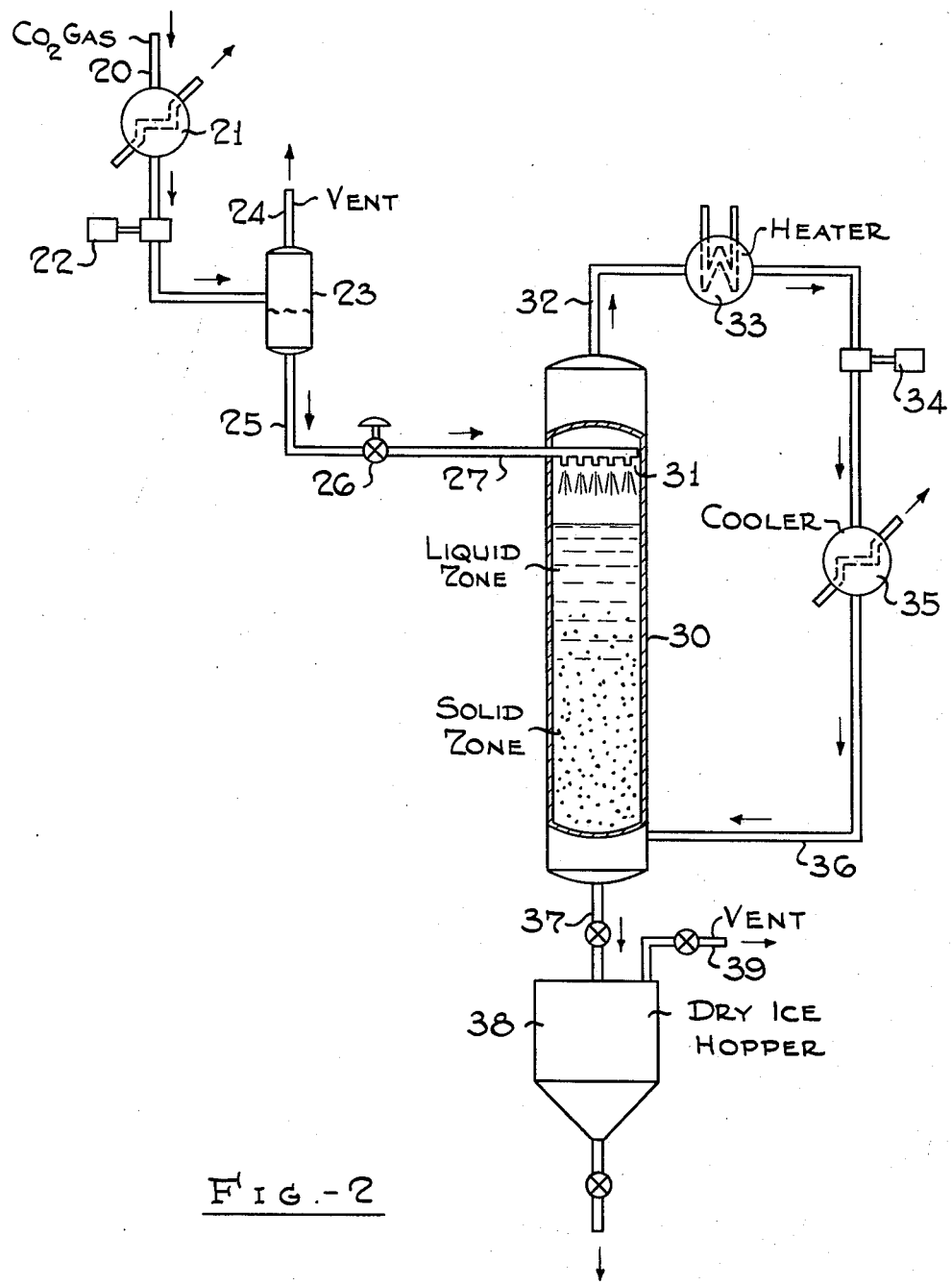

Figure 1 illustrates an adaptation of the invention in which carbon dioxide gas is introduced into a solidification chamber wherein solidification and classification of the carbon dioxide is secured by means of the recirculation of a large stream of a gas which preferably boils lower than carbon dioxide. The carbon dioxide gas is solidified in a solid fluidized state by direct cooling with a vaporizing refrigerant such as methane, nitrogen, ethane or ethylene. Figure 2 illustrates another embodiment of the invention wherein liquid carbon dioxide is dropped vertically through an orifice in a manner to control sphere size followed by super-cooling the liquid and solidifying the sphere by dropping it through a vertical zone cooled by carbon dioxide gas or any other suitable gaseous medium.

Referring specifically to Figure 1, carbon dioxide gas which has been purified of sulfur and other impurities is introduced into the system by means of line 1. The gases are preferably compressed by means of compressing unit 2 and then introduced into the bottom of a solidification zone 10 by means of line 3. Although zone 10 may be of any suitable design, it is preferred that the cross-sectional area increase toward the top of the zone. Conditions are adjusted in zone 10 so as to maintain a fluidized bed of solid $CO_2$. In accordance with this adaptation of the invention, a circulating gas stream which functions to maintain the solid $CO_2$ particles in a fluidized state and also to cool the same is introduced into the bottom of zone 10 by means of line 4. A gas velocity range of 0.2 to 10.0 ft./sec. is used in fluidization zone 10. Preferably, the bottom of the zone 10 will have a velocity of 5–7 ft./sec.; the top of the zone 10 will have a velocity of 0.5–2.0 ft./sec.

The gases are removed overhead through cyclone separator 5 and passed into heating unit 6 wherein the gases are heated slightly to improve compressor operation. The gases are introduced into a compressor 7 by means of line 8, withdrawn from the compressor by means of line 9 and introduced into a cooling or condensing zone 11. In zone 11 the gases are cooled to the desired extent by indirect contact with a satisfactory refrigerant. This liquid stream or cooled gas stream is then sent into the bottom of zone 10 through line 4.

The solidified carbon dioxide is removed from the bottom of zone 10 by means of line 12 and introduced into either storage zone 13 or 14 alternately and further handled as desired. Any $CO_2$ present in zones 13 and 14 may be vented from the system by means of line 15.

When operating in accordance with this method, the temperature maintained in zone 10 is in the range from about 0° F. to —109° F., preferably in the range from —60 to —102° F. The pressure maintained in zone 10 is 15 lbs. per sq. in. to 700 lbs. per sq. in. absolute, preferably in the range from 20 to 75 lbs. per sq. in.

The gas removed from the top of zone 10 is preferably at a temperature and pressure substantially equivalent to those mentioned in the preceding paragraph. However, the fluid introduced into the bottom of zone 10 through line 4 should be from about 5° F. to 30° F. lower than the temperature of the outgoing gas in the top of zone 10. Furthermore, the pressure of the gas introduced into the bottom of zone 10 should be from about 5 to 20 lbs. higher than the gas removed from the top of zone 10.

The temperature of the purified $CO_2$ feed gas introduced into the classifier zone 10 is preferably in the range from 50° F. to 150° F. Pressures are in the range from 20 to 1000 lbs. per sq. in. absolute.

In operating in accordance with this adaptation of the invention, the carbon dioxide gas is not liquefied and thus may be readily available at various temperatures and pressures for a feed material to the solidification zone. Furthermore, by the use of the large single fluid solidification zone, it is possible to produce relatively large particles of snow and Dry Ice. This is due to the accurate control of the process which is obtainable. Also by removing the heat from the feed gas in a centralized single zone, it is possible to utilize large efficient equipment.

Referring specifically to Figure 2, purified carbon dioxide gas free of water, oil, ammonia and sulfur is introduced into the system by means of line 20. The gas is cooled in zone 21 and compressed in zone 22. The liquid $CO_2$ is introduced into separation zone 23 wherein uncondensed gas may be withdrawn through line 24. The liquid carbon dioxide is removed from the bottom of zone 23 by means of line 25 and passed through a pressure reducing valve 26.

The liquid is then introduced into the top of zone 30 by means of line 27. The liquid is admitted into the tower through orifice 31 producing droplets of $CO_2$ which fall downwardly through tower 30. In accordance with the present invention, the bottom of zone 30 is maintained at a temperature of about $-100°$ F. and at a pressure in the range from about 75 to 100 lbs. per sq. in. absolute. In accordance with the invention, carbon dioxide gas is removed overhead from zone 30 by means of line 32, passed through heat exchanging zone 33 and then compressed in compressing zone 34. The fluid is further cooled in refrigeration zone 35 and introduced into the bottom of zone 30 preferably at a temperature in the range from $-100°$ F. to $-109°$ F. by means of line 36. This gas flows upwardly through zone 30 and countercurrently contacts the downflowing liquid and solid particles converting the liquid to solids. These solids are removed from zone 30 by means of line 37 and are introduced into storage zone 38. Vent $CO_2$ is removed through line 39.

Although this adaptation has been described with respect to the recirculation of carbon dioxide, other inert cooling mediums may be employed, as for example, methane, nitrogen, ethane, ethylene, etc. In accordance with the present process, liquid $CO_2$ is sprayed into a gas cooling zone. The cooling is obtained by recirculating gas from the top of the tower to the bottom. The height of the tower may vary appreciably but it is preferred that its height be in the range from about 50 to 150 ft. As the liquid descends, it is supercooled and forms solid carbon dioxide. The velocities are maintained in the range from 0.2 to 5 ft. per second. The size of the spheres obtained is in the range from about 1/8" to 1/2" in diameter. It is to be understood that the liquid introduced into the top of the tower may be supercooled and expanded under pressure.

The feed carbon dioxide is obtainable from several sources. For example, it may be obtained from certain carbon dioxide rich natural gases, or as a by-product of a fermentation process, or by the combustion of various gases, cokes or oil fuels, or by the decomposition of limestone. Obviously, it is essential that the final Dry Ice product be of an extremely high purity for the reason that Dry Ice often comes in direct contact with foodstuffs. Consequently, it is generally essential to highly purify the carbon dioxide irrespective of the particular source of the $CO_2$. It is also very desirable that the particle size of the solid $CO_2$ be controllable in the manufacturing operation.

At the present time many complicated methods are utilized for the purification of $CO_3$ in the Dry Ice industry. All of these methods, however, are characterized by the fact that the purification of the $CO_2$ is carried out in gas phase. In general, three steps are required to attain the necessary purification. The first step may comprise the removal of sulfur compounds generally present in the impure carbon dioxide obtained from the sources mentioned. The sulfur compounds may be removed by a variety of chemical reagents. For example, lead or zinc acetate solutions, sodium carbonate, sodium bicarbonate, caustic, diethanol amine, or other reagents may be employed. A second purification step is the removal of heavy oils and organic liquids and particularly of aromatic oils. Very small traces of heavy oils will impart unfavorable taste and odor to $CO_2$, or to the Dry Ice formed from $CO_2$. In order to effectively eliminate the heavy oils, therefore, gaseous $CO_2$ is conventionally contacted with charcoal, silica gel, etc. or alternatively, the $CO_2$ is carefully fractionated from the heavy oil. The third treating step conventionally required is the removal of excess water. It should be noted that it is not desirable to remove all water, since a small proportion is desirable in order to impart good crystalline structure to the Dry Ice formed. However, excess water is objectionable in tending to freeze control valves, heat exchangers, and the like. Generally, solid drying agents are employed to remove undesired water from impure $CO_2$, as for example, alumina, florite, sulfuric acid, silica gel, as well as other agents.

The present invention is broadly concerned with a fluidized method for the manufacture of carbon dioxide Dry Ice. This is accomplished by introducing either liquid or gaseous carbon dioxide into a solidification chamber. In accordance with preferred embodiments of the process, the gaseous carbon dioxide is introduced into the bottom of a solidification zone whereby solid particles of carbon dioxide form. The upflowing velocity of the carbon dioxide vapors is adjusted in a manner to maintain the mass of carbon dioxide solid particles in a relatively fluidized condition. In accordance with one embodiment of the process, the relatively more buoyant particles are maintained in the flash zone until their size becomes such that they become less buoyant and tend to flow downwardly into the bottom of the flash zone. Thus, it is possible by this process to adjust the size of the solid particles withdrawn from the bottom of the flash zone by controlling the velocity of the upflowing vapors. As the solid $CO_2$ particles become larger, they become less buoyant and flow toward the bottom of the flash zone from where they may be collected and withdrawn.

The invention broadly contemplates the introduction of either liquid or gaseous $CO_2$ into a solidification zone, the temperature of which is controlled by circulating a gas stream. If a liquid be employed, the carbon dioxide is introduced into the top of a solidification zone, while, if a gas be employed, the carbon dioxide is introduced at or near the bottom. It is to be understod also that the carbon dioxide removed from the bottom of the solidification zone may be handled in any manner desired. These solids may be passed into a zone wherein the solids are completely freed of gas and can then be sold as finished Dry Ice product. The solids may be passed to pressing machines and the like, where large cubical blocks of carbon dioxide ice may be manufactured according to conventional practice, if desired.

When an operation is conducted wherein the solid particles are removed from the bottom of the flash zone, the velocity should be adjusted to secure a segregation of the larger particles from the smaller particles, thus, as a particle becomes relatively larger, the velocity of the upflowing gas will not be sufficient to maintain the same in a fluidized state and it will fall to the bottom of the zone for collection and removal therefrom. A very desirable method of operating is to control the process so as to produce spheres having diameters in the range from 1/8 to 1/2" in diameter. This is secured by having an ice residence time in the range from about 5 minutes to 1 hour. The velocity under these conditions of the upflowing gases is in the range from 0.5 ft. per second to 5.0 ft. per second. A desirable velocity is 1.0 to 3.0 ft. per second.

Having described the invention, it is claimed:

1. Process for the preparation of solid carbon dioxide which comprises introducing carbon dioxide gas at an intermediate point into a fluidized solidification zone, the temperature of which is maintained at the desired carbon dioxide solidification point by circulating a cooling stream of carbon dioxide gas therein, said carbon dioxide gas stream being withdrawn from the top of said solidification zone, cooled and reintroduced into said solidification zone at a point below the point of introduction of carbon dioxide feed gas.

2. Process as defined by claim 1 wherein the gas velocity is maintained at about 0.2 to 10 ft./sec.

3. Process as defined by claim 2 wherein the velocity of the upflowing gases is in the range from 0.5 to 5 ft. per second, wherein crystals having diameters in the range from 1/8" to 1/2" are secured.

4. Improved process for the preparation of carbon dioxide Dry Ice which comprises introducing liquid carbon dioxide into the top of a solidification zone, allowing the liquid particles to drop downwardly into said zone and countercurrently contact upflowing carbon dioxide cooling gases, removing the carbon dioxide cooling gases overhead from said solidification zone, cooling the same and returning these gases to the bottom of said solidification zone, adjusting the velocity of said upflowing carbon dioxide cooling gases so as to maintain the liquid carbon dioxide particles in said zone for sufficient residence time to secure desired crystal size.

WALTER H. RUPP.

REFERENCES CITED

The following references are of record in the file of this patent:

UNITED STATES PATENTS

| Number | Name | Date |
|---|---|---|
| 1,893,851 | Sullivan | Jan. 10, 1933 |
| 1,893,852 | Sullivan | Jan. 10, 1933 |
| 2,011,550 | Hasche | Aug. 13, 1935 |
| 2,047,099 | Goosmann | July 7, 1936 |